United States Patent [19]

Julien

[11] Patent Number: 5,630,455
[45] Date of Patent: May 20, 1997

[54] GROOVE FORMING APPARATUS AND METHOD

[76] Inventor: Rejean Julien, 276 Lac Clair, Ste-Mar Guerite Du Lac, Masson, Quebec, Canada, J0T 1L0

[21] Appl. No.: 395,531

[22] Filed: Feb. 28, 1995

Related U.S. Application Data

[63] Continuation-in-part of Ser. No. 251,138, May 31, 1994, abandoned.

[51] Int. Cl.$^6$ ........................................... B27C 5/00
[52] U.S. Cl. ........................ 144/372; 33/565; 144/2.1; 144/134.1; 144/136.95; 144/144.1; 144/286.5; 144/371; 409/125; 409/130; 409/178
[58] Field of Search ........................... 144/144 R, 144 S, 144/144 SGT, 371, 372, 373, 367, 2 R, 286 R, 286 A, 134 R, 136 R, 134.1, 136.95, 144.1, 144.51, 144.52, 154 S, 286.1, 286 S, 2.1; 33/628, 565; 409/125, 130, 178, 182

[56] References Cited

U.S. PATENT DOCUMENTS

| | | | |
|---|---|---|---|
| 3,130,760 | 4/1964 | Juneman | 144/144 S |
| 3,301,287 | 1/1967 | Edwards | 144/144 R |
| 4,230,164 | 10/1980 | Mericle | 144/372 |
| 4,932,450 | 6/1990 | Baker | 144/367 |
| 5,123,466 | 6/1992 | Ellsworth | 144/144 R |

FOREIGN PATENT DOCUMENTS

| | | | |
|---|---|---|---|
| 1271691 | 7/1990 | Canada | B27C 5/10 |
| 2064078 | 2/1991 | Canada | B27M 1/08 |
| 1292173 | 11/1991 | Canada | B27C 5/02 |

*Primary Examiner*—W. Donald Bray
*Attorney, Agent, or Firm*—Mila Shvartsman

[57] ABSTRACT

The present invention relates to a machine for forming grooves of uniform configuration in a face surface of a one-piece frame such that the adjacent grooves meet at inside corners to define miter lines. This machine comprises a support means adapted to securely support a side of the frame under a predetermined angle with relation to the horizontal plane, a cutter assembly having a cutter means, a first guiding means adapted to guide the cutter means along the respective miter line in order to cut the inside corner and the miter line, and a second guiding means adapted to guide the cutter means along the side of the frame to cut a side groove portion extending between the opposite miter lines on the side of the panel. The frame is extended from the support means outwardly upwardly, and the first guiding means further comprises a stop means adapted to restrict the movement of the cutter means beyond the area designated for formation of the respective inside corner defined by the corresponding miter lines. The cutter means are adapted to cut the groove in the frame of any desired profile, and the support means are adapted to support the frame under any predetermined angle.

11 Claims, 5 Drawing Sheets

GROOVE FORMING APPARATUS AND METHOD

This application is a continuation-in-part of my earlier filed application Ser. No. 08/251,138 filed May 31, 1994, abandoned.

The present invention relates to the field of wood carving accessories and more particularly to a groove forming apparatus for carving one piece frame and a method of manufacturing of such article.

There is known Canadian patent 1,292,173 related to a groove forming apparatus and method comprising a base structure having locating surface means, positioning means mounted proximate to the forward end of the base structure, a groove forming motor assembly, a mounting frame and a spring means operatively engaged between the frame member and the motor assembly.

There is also known Canadian patent 1,271,691 for frame routing apparatus comprising a router having an elongated cutter stem of polygonal cross sections, a cutter head at the end of the stem, wherein said head forming generally outwardly outer surfaces.

There is still known Canadian patent application 2,064,078 for corner cutting shear machine for forming inside corners first and second cutter assemblies, means for mounting each shear cutter, means for mounting said panel having partial grooves formed therein and means for driving each of the cutters along its respective path within the groove.

The object of this invention to provide a device which allows for carving a groove of uniform configuration in one-piece integral frame by means of using a single cutting element which was not possible to manufacture with the previously known devices.

Another object of this invention is to provide a device in accordance with the previous object which will conform to conventional forms of manufacturing and in the same time be of simple construction and easy to use, economically feasible, long lasting and relatively trouble free in operation.

SUMMARY OF INVENTION

Broadly, the present invention relates to a machine for forming grooves of uniform configuration in a face surface of a one-piece frame such that the adjacent grooves meet at inside corners to define miter lines, said machine comprises:

a support means adapted to securely support a side of the frame under a predetermined angle with relation to the horizontal plane;

a cutter assembly having a cutter means;

a first guiding means adapted to guide said cutter means along the respective miter line in order to cut the inside corner and said miter line, and a second guiding means adapted to guide said cutter means along the side of said frame to cut a side groove portion extending between the opposite miter lines on said side of the panel. Said frame is extended from said support means outwardly upwardly, and said first guiding means further comprising a stop means adapted to restrict the movement of said cutter means beyond the area designated for formation of the respective inside corner defined by the corresponding miter lines.

In another embodiment of the present invention, said cutter means adapted to cut the groove in said frame of any desired profile, and said support means adapted to support said frame under any predetermined angle. Said support means adapted to securely hold said frame by bias means, and said support means adapted to simultaneously support a predetermined number of said frames.

In yet another embodiment, said first guiding means comprises a template having an inner perimeter comprising left and right sides, wherein said sides are substantially parallel to corresponding left and right miter lines of said supported side of the panel. Said stop means further comprises an adjustment means adapted to adjust the position of said stop means depending on any particular dimension of said frame, and said adjustment means comprises a vertical adjustment means adapted to adjust the position of said stop means depending on the thickness of said frame and a horizontal adjustment means adapted to adjust the position of said stop means depending on the angle of said inside corners.

In still another embodiment, the present invention relates to a method of forming grooves of uniform configuration on a face surface of a one-piece frame such that the adjacent grooves meet at inside corners to define miter lines, said method comprising the steps of:

machining a central portion of said frame;

curing by a cutter means the respective miter lines and inside corners on a side of said frame, wherein said cutter means are guided by means of a first guiding means;

cutting by said cutter means a side groove portion extending between opposite miter lines on said side of the frame, wherein said cutter means are guided by means of a second guiding means. Said opposite miter lines comprising left and right miter lines, and wherein said right miter line including a corresponding inside corner being formed after the step of formation of said side groove portion. The steps of formation of said left and right miter lines including corresponding inside corners and said side groove portion are a continuous and uninterrupted process.

In yet another embodiment, the present invention relates to a one-piece frame formed from a single piece material comprising a frame member having four side portions;

a continuous groove of uniform configuration formed on a face surface of said frame member, wherein said groove comprises side groove portions meeting at each adjacent inside corner of said frame to define a corresponding miter line, wherein said groove is formed by a continuous cutting process by means of a cutter means, wherein said cutter means is adapted to cut both: the side groove portions and the inside corners. Said cutter means having first and second guiding means adapted to direct said cutter means along designated area defining said groove.

BRIEF DESCRIPTION OF DRAWINGS

The above mentioned and other advantages of this invention will be better understood in reference to the following description and drawings in which.

DETAILED DESCRIPTION OF THE INVENTION

Figure 1:
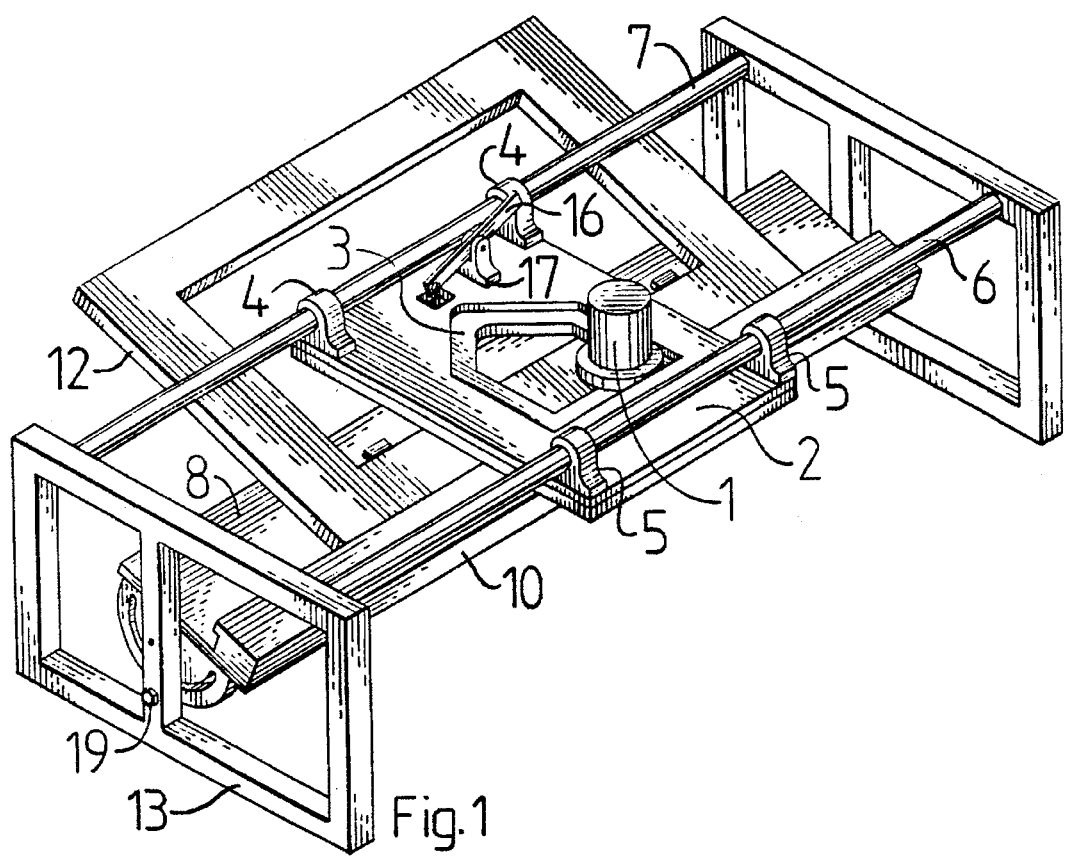
FIG. 1 is a perspective view of the present invention.
Figure 2:
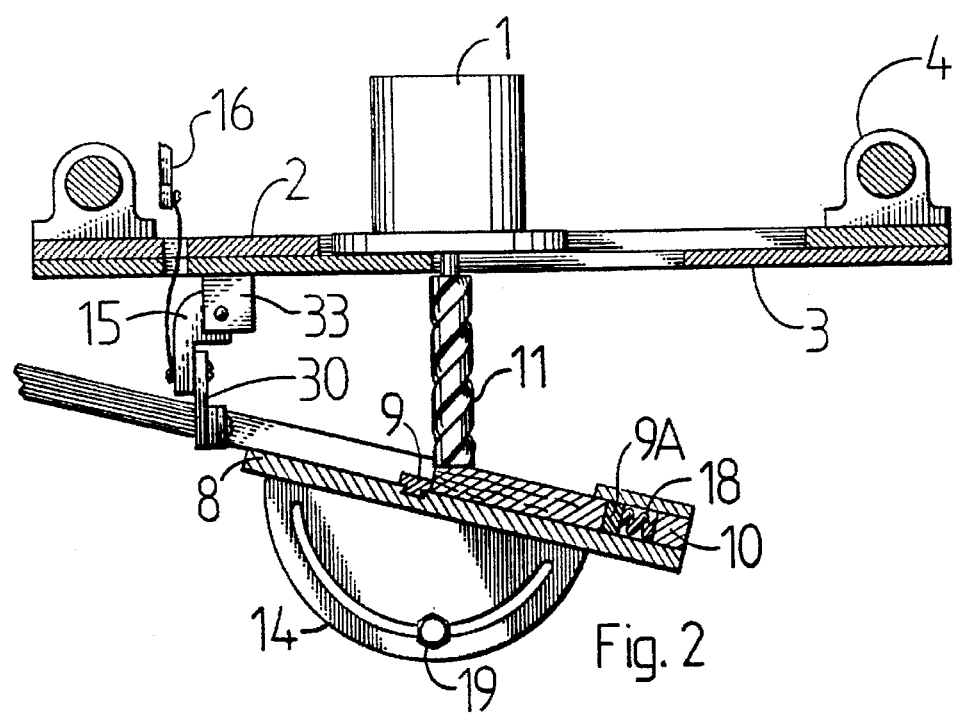
FIG. 2 is a fragment of side cross-sectional view of the present invention.
Figure 3:
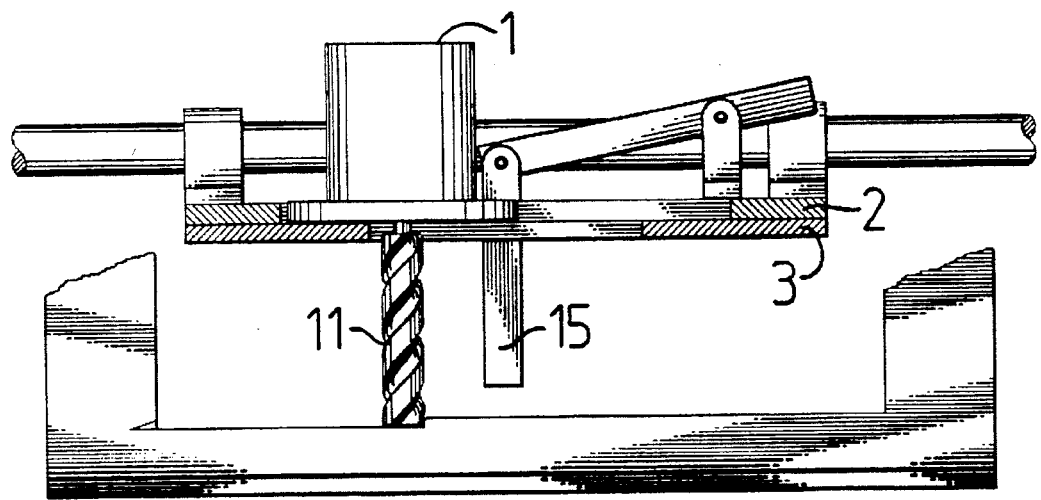
FIG. 3 is a fragment of front cross-sectional view of the present invention.
Figure 4:
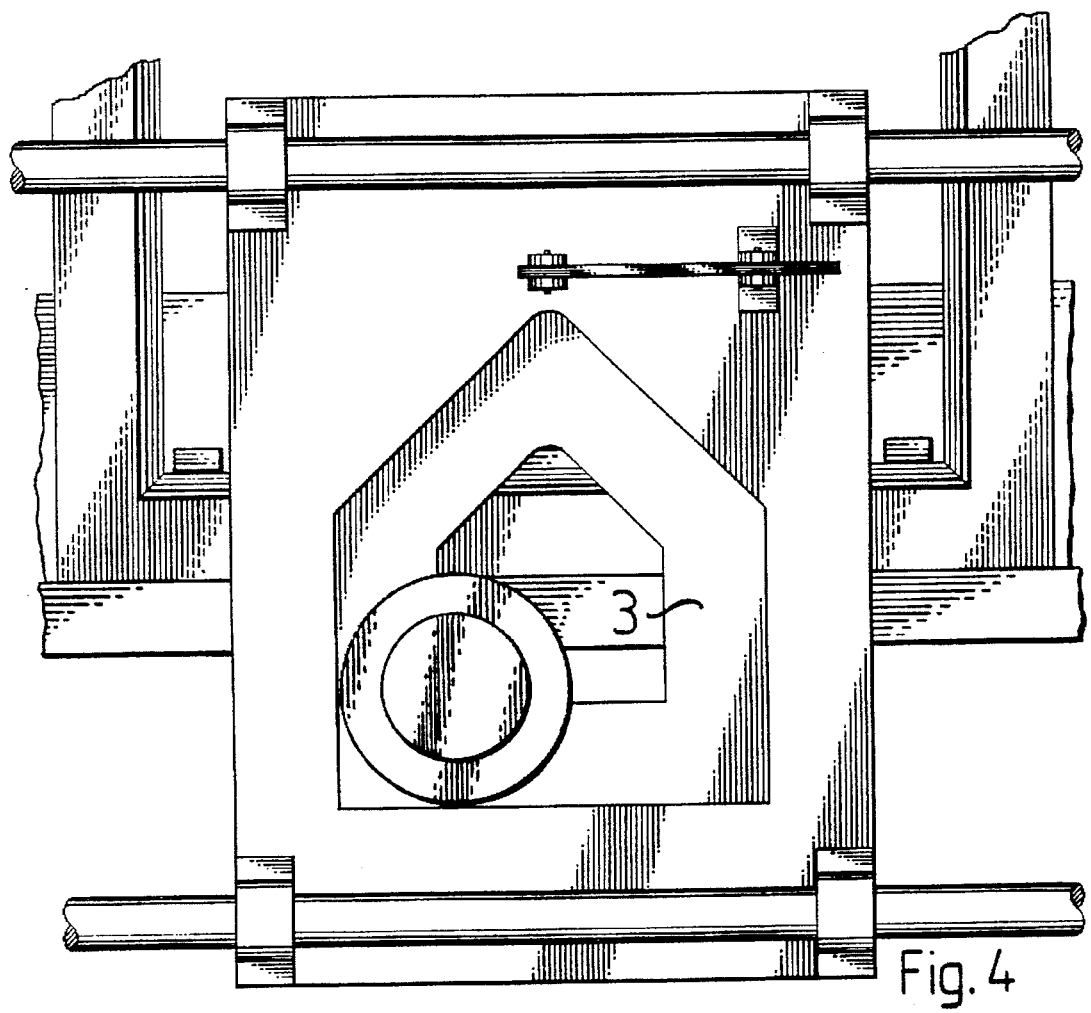
FIG. 4 is a fragment of the top view of the present invention.
Figure 9:
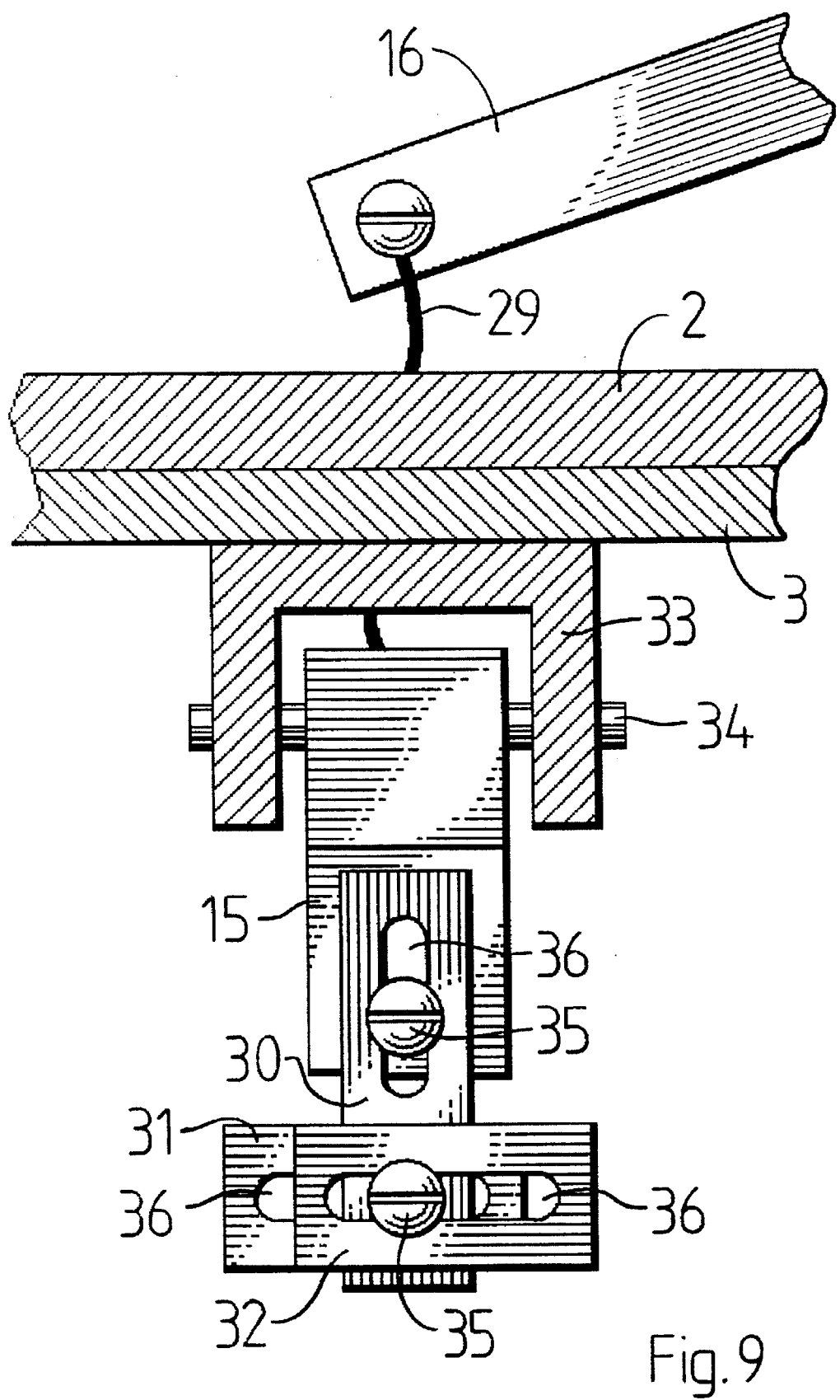
FIG. 9 shows a fragment of front view of FIG. 2 depicting stop means assembly.

Referring now to FIG. 1 the present device comprises a conventional electrical router assembly 1 removably placed within a holding plate 2. Spindle (not shown) is incorporated within said electrical router assembly 1. A bit or a cutter means 11 of the router assembly 1 extends through a first guiding means or template 3. This template 3 is mounted below the holding plate 2 and is provided with an inner perimeter to guide bit 11 during the steps of forming left and right inside corners formed by the meeting of two adjacent grooves made on the face surface of a frame 12, the side of which is securely supported on a support means or support frame 13. One part of said inner perimeter of the template 3 (see FIG. 4) comprises an isosceles triangle having two sides (left and right) which meet at 90 degrees angle to each other, said sides are oriented to be substantially parallel to respective left and right miter lines defining corresponding left and right inside corners formed by meeting of two adjacent grooves made on the face surface of the supported side of frame 12. The holding plate 2 is slidably mounted by means of set of bearings 4 and 5 on a sliding cylinders 7 and 6 respectively, which in turn are mounted on the support frame 13. Those sliding cylinders 6 and 7 in combination with bearings 4 and 5 represent second guiding means adapted to guide the movement of router 1 alongside the supported side of frame 12 to cut a side groove portion extended between left and right miter lines defining the corresponding inside corners. The profile of the groove formed on the face surface of the panel or frame 12 depends on the angle under which said frame 12 is placed on the supporting plate 8. Referring to FIG. 2, the frame 12 is securely mounted on the supporting frame 13 by means of supporting plate 8 provided with retaining grips 9. Said retaining grip 9 has a spring biased mechanism 18 mounted between the movable portion of said retaining grip 9A and an abutting wall 10 for retaining the side of frame 12. Depending on the size, it is possible to mount a number of frames to be processed in one step. The supporting plate 8 may be adjusted to any desired angle by means of gradated disk plates 14 provided with a corresponding circular slot and pressure knob 19, which allows to form grooves of any desired profile on the face surface of the frame 12 supported on said supporting plate 8. The bit 11 is also interchangeable which allows to form a groove of any desired configuration. As it clearly shown on FIGS. 2 and 9, template 3 is provided with a stop means or stopper 15 pivotally mounted underneath the template 3 by means of inverted U-shaped bracket 33 and axis 34. The stopper 15 is connected to a pivotal arm 16 mounted on a stop support 17 by means of a flexible cable 29. The stopper 15 is provided with an adjustment means comprising a vertical adjustment element 30 and horizontal adjustment elements 31 and 32. Those elements 30, 31 and 32 are mounted on a lower portion of the stopper 15 by means of identical bolts 35. The main purpose of those adjustment means is to restrict the movement of cutter bit 11 beyond predetermined area of the side of frame 12 designated for formation of miter lines defining left and right inside corners. In the absence of such stopper, the bit 11 may go beyond the designated area and spoil the desired configuration of the groove. In case there are more than one frame to be treated, the stopper 15 may be manually retracted to allow to move the cutting assembly to the next frame.

In operation the frame 12 is preliminary machined by any conventional means to remove a central portion thus forming a one-piece frame element. Further one side of said frame 12 is positioned onto supporting plate 8 mounted under predetermined angle in the relation to plane surface. Retaining grip 9 provided with spring biased mechanism 18 allows to securely hold said frame 12. Further the adjustment means of stopper 15 are adjusted to the specific positions depending on the thickness of the panel to be treated. In this case vertical adjustment element 30 is adjusted depending on the thickness of the panel 12.

The thicker the panel, the higher the position of element 30. The adjustment of element 30 is provided by means of slot 36 formed inside said element. Horizontal adjustment elements 31 and 32 have similar slots 36, wherein element 31 is provided to adjust the movement of bit 11 during the process of formation of miter line defining left inside corner and element 32 provides adjustment of the movement of bit 11 during the process of formation of miter line defining the right inside corner. Those horizontal elements 31 and 32 are provided with dual functions: in one aspect, they regulate the angle and width of the groove within the area defining the corresponding inside corner, and in the other aspect, they are adjustable depending on the size of a particular bit (in order that the bit stops at the right moment). Then holding plate 2 is moved on top of the frame 12 and the router 1 is first positioned at the 90 degrees corner of the triangle identifying the apex of template 3. While moving along the left side of said triangle portion of template 3, the bit 11 is cutting the miter line defining the left inside corner of frame 12. The stopper 15 by means of adjustment means 30, 31 and 32 prevents the bit 11 from moving beyond the designated area. For example, when stopper 15 reaches left inside corner of the frame 12, horizontal adjustment element 32 will abut the inner wall of the frame 12, thus restricting movement of bit 11 beyond designated area for forming left inside corner. Similar procedure will take place when the right inside corner is made by assistance of the horizontal adjustment element 31. After the left miter line and left inside corner are formed, the cutter assembly including router 1 and holding plate 2 are slidably moving along the side the frame 12 to cut the side groove portion extended between left and right miter lines of the supported side of frame 12. When the cutter assembly reaches the right corner, bit 11 will move along the right side of the triangle portion of template 3 to form the miter line and the right inside corner of the frame 12. As in a previous step, the stopper 15 will restrict the movement of the bit 11 within the designated area. The steps of forming both left and right inside corners and the groove extending between those corners is continuous. Similar steps are taken to cut grooves and inside corners on all other three sides of frame 12. As it was mentioned before, it is possible to treat simultaneously a number of frames supported on said supporting plate 8 depending on their dimensions. In this case the stopper 15 should be retracted manually during switching from one frame to the other.

It is also possible to form grooves and inside corners in one-piece frames having triangular, hexagonal or octagonal configurations, which was not possible to perform by any known machines. For this reason the template 3 is modified accordingly by means of changing the angle between the guiding sides. For example, for triangular frame the angle should be 60 degree instead of 90 degree.

Figure 5:
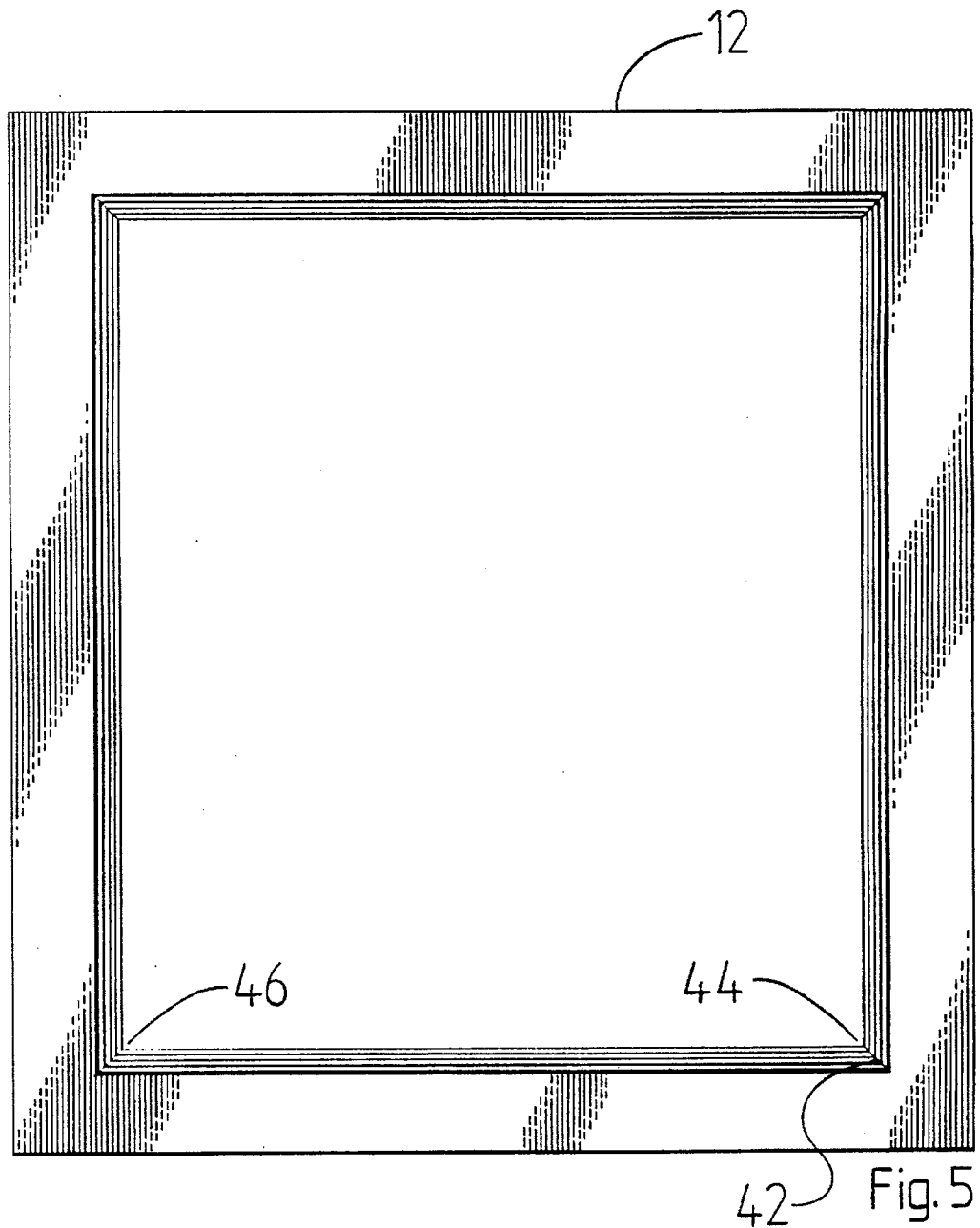
FIG. 5 is a top view of the one-piece frame manufactured according the method of the present invention.
Figure 6:
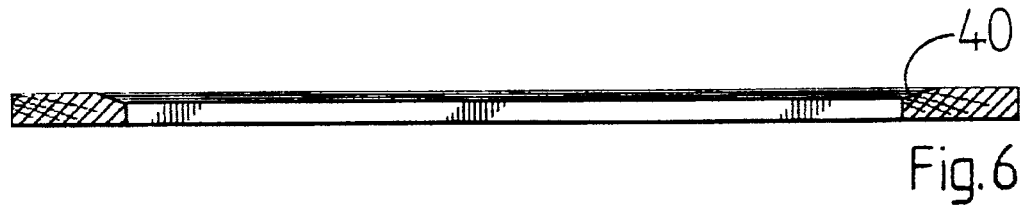
FIG. 6 is a cross-sectional view of the frame shown on FIG. 5.

The finished product, illustrated on FIGS. 5 and 6 is a one-piece element having a continuous groove of uniform configuration. Such uniformity was not possible to produce by using known machines, such as shown in U.S. Pat. No. 4,932,450, since in said machine side groove portions are formed by one tool (spindle shaper) and the inside corners are formed by the other tool (shearing cutters). In this case it is very difficult to produce the uniformity of the complete groove, since it is necessary to match profiles of those tools very precisely, or to use additional sanding step.

One-piece frame 12 shown on FIGS. 5 and 6 comprises four side frame. The face surface of the frame 12 has a continuous groove 40 consisting of side groove portions and corner groove portions formed by two adjacent side groove portions met at each corner. Those corner groove portions are forming inside corners, such as left inside corner 44 and right inside corner 46. Those inside corners are defining the respective miter lines 42.

Suggested materials to be used for making one-piece frame according the present invention are: wood, presswood, fibre, plastic, etc.

Figure 7:
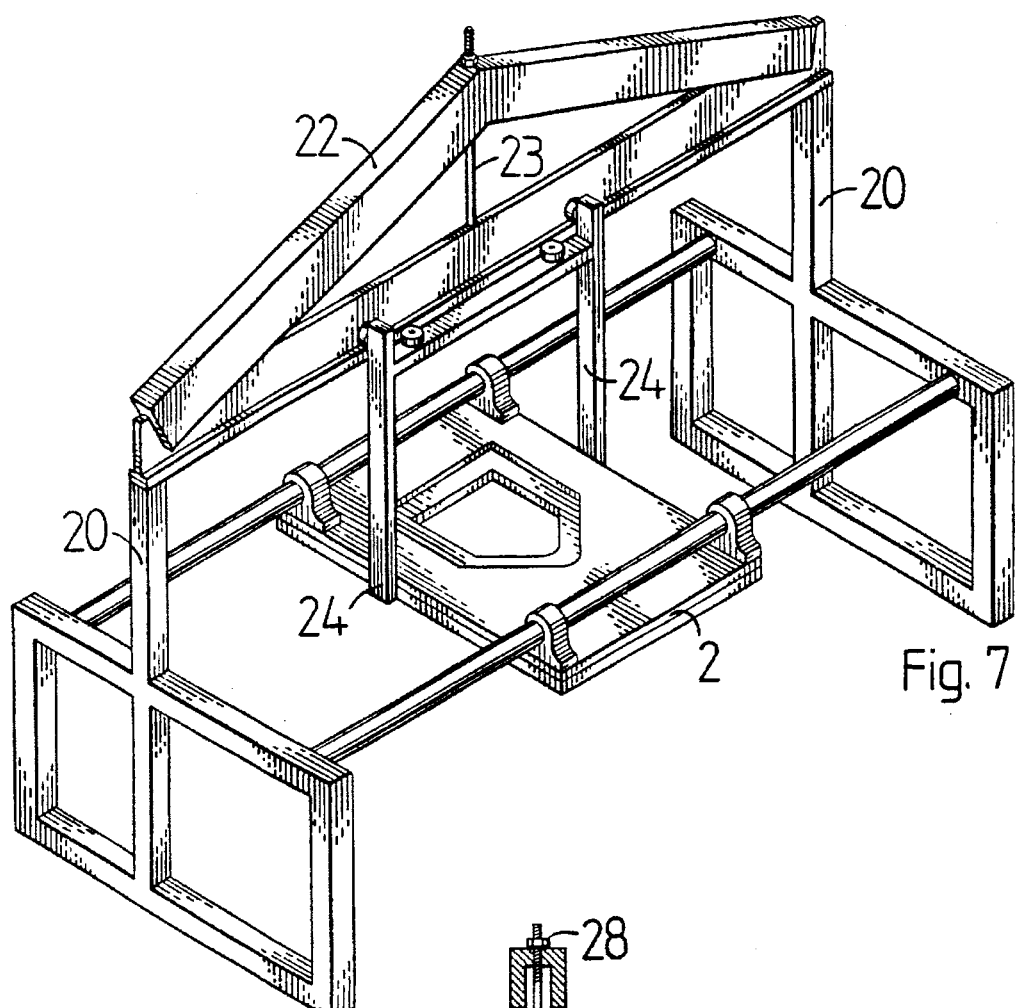
FIG. 7 shows a perspective view of a second embodiment of the present invention provided for manufacturing frames of large size.
Figure 8:
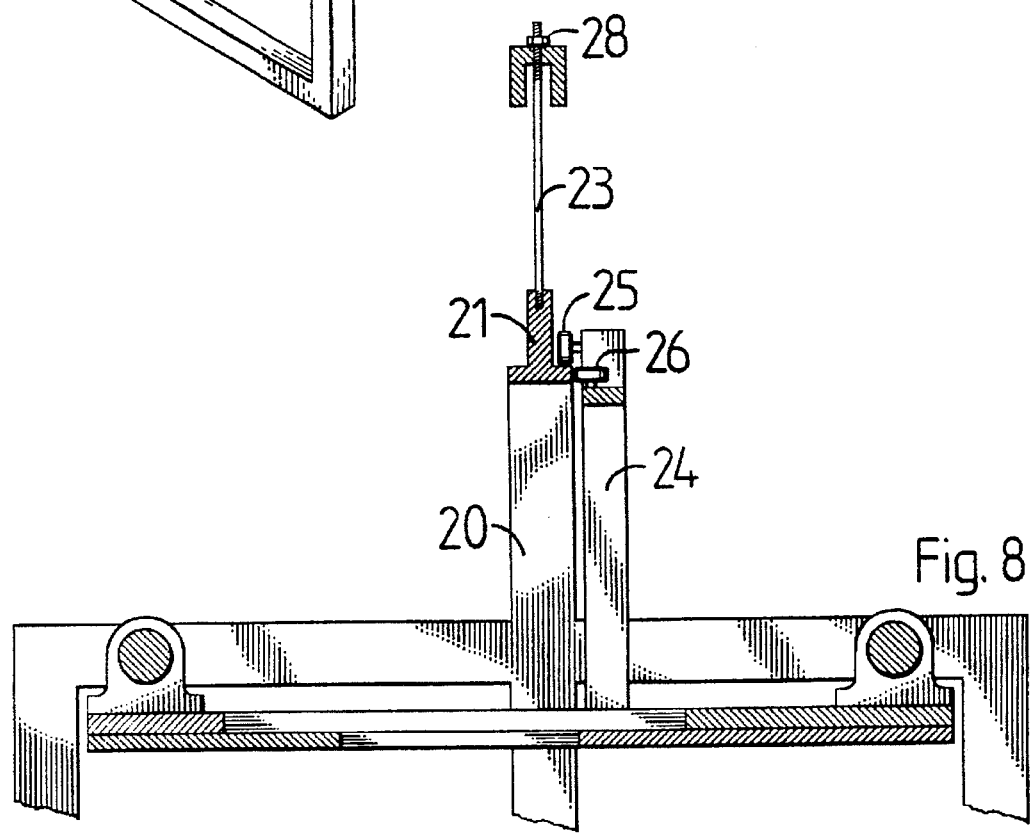
FIG. 8 shows a fragment of side cross-sectional view of FIG. 8.

FIGS. 7 and 8 represent a second modification of the present embodiment specially designed for manufacturing of large size frames. This arrangement additionally comprises vertical reinforcement bars 20 extending from both sides of the support frame 13. Those bars 20 are connected by means of transverse bar 21, which in turn is reinforced by means of angled support bar 22 and vertical central rod 23 provided with a tension nut 28. Holding plate 2 is additionally provided with vertically oriented plate guiding element 24 having an inverted U-shaped configuration. FIG. 8 shows that transverse bar 21 in the cross-section has an inverted T-shaped configuration, which allows to guidingly move holding plate 2 by means of respective guiding rollers 25 and 26 mounted on said plate guiding element 24.

The new machine and method provides the following advantages if compare with the known systems:

- in the present invention it is possible to use pine fibre which is light in weight, less expensive and allows to manufacture a one-piece frame. In the same time known systems use wood "liner" which is heavy in weight, more expensive by the foot and consists of four pieces which have to be cut in order to make one frame. Besides, each of those four pieces has to be cut individually;
- the process according to the present invention is less time consuming in comparison with known processes, wherein it is necessary to cut four separate pieces, bevel them separately and then glue together and sand every corner;
- the present invention produces a long lasting product, since it is not cut in corners, wood is more rigid and therefore keeps its initial form; cracks do not appear in the corners under the liner as it happens in known products, thus keeping the appearance for many years;
- present technique allows to form one-piece frame having a grooves and inside corners of uniform configuration which provides outstanding aesthetic appeal which is very desirable feature for such product;
- one of the most important advantages is the fact that the present machine allows to use pine fibre, which is recycled product which in turn may be further recycled.

Although the invention has been herein shown and described in what is conceived to be the most practical and preferred embodiments, it is recognized that departures may be made therefrom within the scope of the invention, which is not to be limited to the details disclosed herein, but is to be accorded the full scope of the claims, so as to embrace any and all equivalent devices and apparatus.

What is claimed:

1. A machine for forming grooves of uniform configuration in a face surface of a one-piece frame such that adjacent grooves meet at inside corners to define respective miter lines, said machine comprises:

a support means adapted to securely support said frame, wherein said frame being oriented in said support means at a predetermined angle with respect to the horizontal plane;

a cutter assembly having a cutter means;

a first guiding means adapted to guide said cutter means along the respective miter line in order to cut corner groove portions forming said inside corners, and a second guiding means adapted to guide said cutter means along a side of said frame in order to cut a side groove portion.

2. A machine according to claim 1, wherein said first guiding means further comprising a stop means adapted to restrict the movement of said cutter means within the area designated for formation of the respective inside corner defined by the corresponding miter lines.

3. A machine according to claim 1, wherein said cutter means is adapted to be interchangeable, which allows said groove to be of any desired configuration.

4. A machine according to claim 1, wherein said support means is adapted to support said frame at any desired angle depending on the specific profile of said groove.

5. A machine according to claim 1, wherein said support means is adapted to securely hold said frame with a bias means.

6. A machine according to claim 5, wherein said support means is adapted to simultaneously support a predetermined number of said frames.

7. A machine according to claim 1, wherein said first guiding means comprises a template comprising an inner perimeter, wherein one part of said inner perimeter forms an apex of an isosceles triangle having left and right sides which are oriented to be substantially parallel to respective miter lines, and wherein said cutter means is adapted to be guided along said left and right sides thus forming said inside corners.

8. A machine according to claim 2, wherein said stop means further comprises an adjustment means adapted to adjustably limit and restrict the movement of said cutter means depending on various dimensions of said frame.

9. A machine according to claim 8, wherein said adjustment means comprises a vertical adjustment means, wherein said vertical adjustment means is adapted to adjustably limit the movement of said cutter means depending on the thickness of said frame and a horizontal adjustment means, wherein said horizontal adjustment means is adapted to adjustably limit the movement of said cutter means depending on the angle of said miter line defined by said inside corner.

10. A method of forming grooves of uniform configuration on a face surface of a one-piece frame, such that the adjacent grooves meet at inside corners to define respective miter lines, said method comprising the steps of:

machining a central portion of said frame;

cutting corner groove portions by a cutter means thus forming corresponding inside corners defining respective miter lines, wherein said cutter means is guided by a first guiding means;

cutting side groove portions by said cutter means, wherein said cutter menus are guided by a second guiding means.

11. A method according to claim 10, wherein the steps of formation of two opposite inside corners and said side groove portion extending between those inside corners is a continuous and uninterrupted process.

* * * * *